United States Patent [19]
Marshall et al.

[11] 3,733,555
[45] May 15, 1973

[54] SHOCK SPECTRUM ANALYZER AND SYNTHESIZER SYSTEM

[75] Inventors: Phillip Marshall, Lexington; Randall L. Kroken, Wilmington, both of Mass.

[73] Assignee: Marshall Research & Development Corp., Burlington, Mass.

[22] Filed: Aug. 19, 1970

[21] Appl. No.: 65,191

[52] U.S. Cl....................................328/14, 328/106
[51] Int. Cl.................................................H03b 19/00
[58] Field of Search..........................328/14, 27, 106; 331/38; 324/77 B

[56] References Cited

UNITED STATES PATENTS

| | | | |
|---|---|---|---|
| 3,293,561 | 12/1966 | Hegarty et al. | 328/14 X |
| 3,579,117 | 5/1971 | Norris | 328/27 |
| 3,265,973 | 8/1966 | Darlington et al. | 328/14 |
| 3,331,035 | 7/1967 | Stickholm | 328/14 X |
| 3,512,092 | 5/1970 | Thurnell | 328/14 |

*Primary Examiner*—Herman Karl Saalbach
*Assistant Examiner*—B. P. Davis
*Attorney*—Irving S. Rappaport

[57] ABSTRACT

A shock spectrum analysis and synthesis method and apparatus which includes the use of a shock spectrum analyzer and a shock spectrum synthesizer. The spectrum analysis provides an automatic simultaneous shock spectrum analysis of both the primary and residual spectrum responses for a plurality of single-degree-of-freedom, mass-spring-damping systems of a plurality of natural frequencies and displaying the output signals on an oscilloscope or X-Y recorder. The synthesis comprises generating a variable transient electrical input to a vibration shaker system by generating a plurality of steady state signals each having a different frequency. A predetermined number of the lowest frequency waves are summed and then the remaining oscillating waves are sequentially gated in an order corresponding to the higher frequencies first. Then all the waves are summed to produce the desired transient.

3 Claims, 7 Drawing Figures

PHILIP MARSHALL
RANDALL L. KROKEN
INVENTORS.

BY Irving S. Rappaport
ATTORNEY.

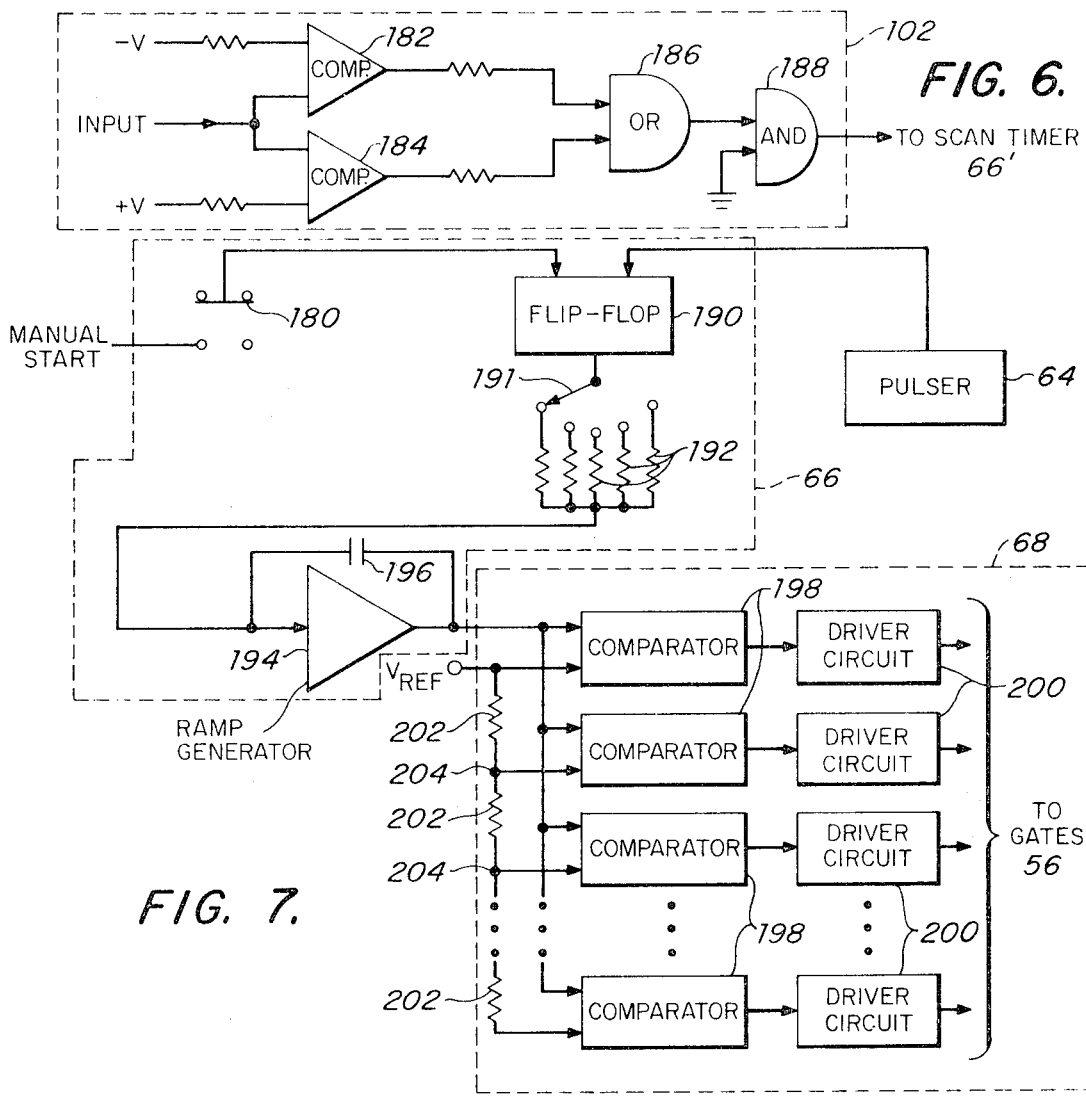
FIG. 6.
FIG. 7.
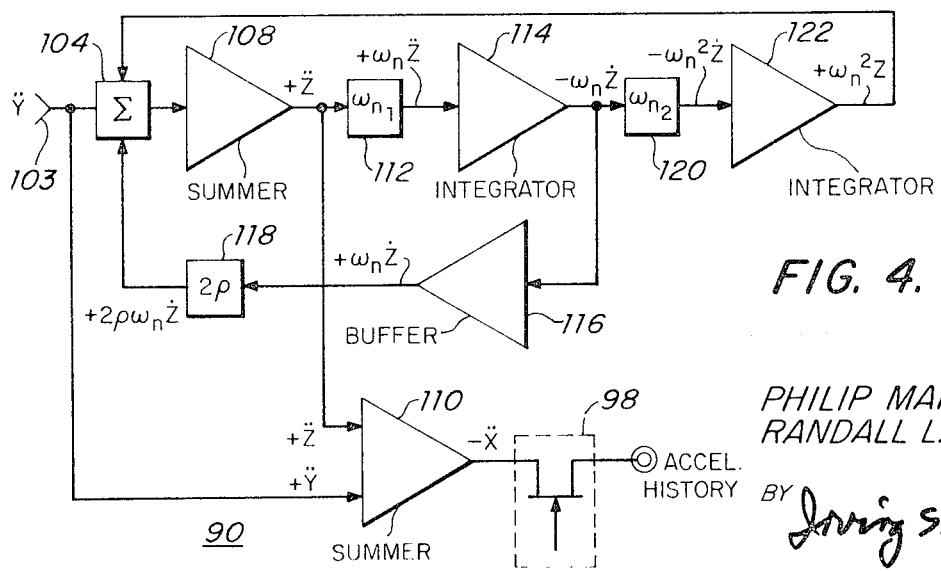
FIG. 4.
PHILIP MARSHALL
RANDALL L. KROKEN
INVENTORS.
BY Irving S. Rappaport
ATTORNEY.

SHOCK SPECTRUM ANALYZER AND SYNTHESIZER SYSTEM

In any enough time history, those phenomena that do not last long enough to be considered part of a stationary process, and that are not repeated often enough to be studied statistically, will be called transients. A rapidly applied transient motion will be referred to as a shock if its duration is shorter than the shortest decay time associated with the significant interior resonances of the structure to which it was applied.

Two basic methods are used to describe a shock motion: in terms of its intrinsic characteristics, and in terms of the effects it causes on the structures to which it is applied. The first method can be used in the time or in the frequency domain, and for a complete definition the acceleration, velocity, or displacement records of the input transient are necessary. The second method is said to be in the response domain because it is concerned with the response of the structure, equipment, or system, rather than with the nature of their excitation. With this method, the description is related to the damage potential of the shock.

Unfortunately, not much is known about the fundamentals of damage caused by shocks. It is usually assumed that damage is caused by the acceleration experienced within the equipments or structures. Shock spectrum testing is based on the concept that the severity of a shock should be measured by or related to the response of a single degree of freedom mass-spring system, and not on any characteristic of the shock itself. This concept has not been adopted universally yet, but it offers definite advantages over the methods which are concerned only with the nature of the input shock transient.

If the shock is defined in terms of its intrinsic characteristics, the shock measurement is normally a time plot of a shock parameter over the duration of the shock. The higher frequency components of the shock are frequently attenuated by filters.

If the shock is defined in the response domain, measurement of the response spectrum can be made directly by using a reed gage which is generally limited to around 20 Hz, and recording the maximum deflection of the reeds relative to the frame. Now it is also possible to measure the spectrum using a shock synthesis and analysis system. No filtering of the accelerometer signal that would affect the shock spectrum in the frequency band of interest is required.

In general, shock tests are performed for two purposes: to determine if the equipments or structures will withstand actual field conditions, as in acceptance testing, and to evaluate the nature of failures as an aid in the design of those equipments or structures.

Prior art shock testing of structures has usually been accomplished by drop testing or by impacting the equipment with a moving mass. More recently attempts have been made to use electrodynamic shake tables for applying the desired test transient. These efforts have accompanied the production of large shake tables and electronic amplifiers, and have arisen not only from the desire to allow greater flexibility in controlling the magnitude and duration of the test pulse, but also from a consideration of potential cost reduction that can be realized if the same apparatus could be used for both shock and vibration testing. For the most part, the use of electrodynamic shake tables has been confined to the production of approximate classical time functions, such as the half-sine and saw-tooth acceleration pulses. These test pulses generally bear little resemblance to the complex transients actually experienced in the operating environment encountered in missiles and space vehicles during ignition, stage separation and landing impact. The amplitude and duration of the test pulses are generally so chosen as to produce a shock spectrum, that is, at all frequencies, in excess of that associated with transients measured in the actual operating environment. Since the pulse shape fixes the shape of the response spectrum, the test engineer must accept spectral magnitudes at some frequencies that are considerably in excess of operational levels. Furthermore, it is usually not possible to ameliorate the distortion introduced by the dynamic response of the test fixture.

The three approaches to shock testing which may be utilized in describing a shock test are: (1) specify the shock 2on which the test is to be performed; (2) specify the shock pulse shape or (3) specify the shock spectrum.

In the approach where the shock machine is specified, test specimens are bolted to the machine bed which is belted by a large hammer. Since the machine bed has many structural resonances, the passing or failing of a test could be determined by the location on the table bed where the specimen was fastened. It is not unknown for a specimen to pass a test on one machine and fail an identical test when tested on another machine. If the test specimen failed, the design engineer has little information to utilize to redesign the failed item. Equipment which passes these tests usually have a good record of serviceability. These machine were developed to simulate the effects of gun blast on shipboard equipment. The sand-drop shock machine is another example where the test is specified by designating the machine. Here, the test specimen on the shock machine table is dropped on a bed of sand from a predetermined height. The resulting pulse shape does not repeat accurately.

Many industrial and military specifications define the time history of the acceleration shock pulse. Typical shapes are the half-sine and saw-tooth. Here, at least, the shock pulse is defined mathematically. However, to specify a pulse shape one must also specify the associated tolerances which can become difficult because of fixture resonances and characteristics of the instrumentation used to measure the pulse such as a high and low frequency response. The results of these tests usually are very repeatable when performed on the same shock machine. However, the same results are not always obtained on different machines because of differences in actual pulse shape and fixture or machine resonances.

Shock spectrum is defined as the maximum response of a series of single-degree-of-freedom systems to a transient pulse as a function of the natural frequency of the system. The procedure in the shock spectrum approach is to specify the damaging effects of the shock in terms of response motion instead of defining the shock itself or the method of generating the shock as in the previous paragraphs.

This method for describing a shock transient involves the determination of the response spectrum produced by the transient. The response spectrum does not define the shock transient but instead defines the effect of the shock upon the dynamic response or hypothetical single-degree-of-freedom resonators having various natural frequencies. There are several types of response spectra which are employed. First of all, the hypothetical resonators may be damped or undamped, thereby yielding damped or undamped response spectra. Secondly, the total response spectrum, whether damped or undamped, can be divided into a primary spectrum and a residual spectrum. The primary spectrum is defined as the peak value of the response that occurs during the time interval that the shock transient is in effect; the residual spectrum is the peak response after the shock transient has terminated. The peak response that occurs, irrespective of when it occurs, defines the total spectrum. In practice, the total spectrum is generally employed, and in general, some level of damping is assigned to the hypothetical resonators.

Typical examples of where shock spectrum information would be utilized are: (a) To define shipping environments such as car humping; (b) To define nuclear weapons environments as in hardsite specification where the actual waveform of the shock is extremely complex; (c) To define the pyrotechnic effects of missile stage separation; (d) To comply with military program shock pulse specifications; (e) To determine the actual severity of shock pulses generated in many laboratories to the same specification; (f) To determine the damage potential of a complex transient environment; (g) To determine the maximum values of acceleration, velocity, and relative displacement involved in the shock motion; (h) To provide the design engineer with meaningful data he can use to perform a stress analysis; (i) To satisfy shock test specifications; (j) To provide data on why a specimen has failed to pass a shock test.

Shock spectrum has been defined as the maximum response of a series of single-degree-of-freedom systems to a transient pulse as a function of the natural frequency of the system. This information can be used to define the damage potential of a transient pulse because it defines the maximum responses which may be related to induced stress.

The excitation motion, common to all systems, is a transient acceleration of the base, $\ddot{y}$. Each mass spring combination has a different natural frequency. It should be noted that the response acceleration motion of the mass, $\ddot{x}$, is a function only of the natural frequency of the system. That is, masses of 1 pound or 1 ton would respond with identical motion if both were supported on spring suspensions which give the identical natural frequency.

$$\ddot{x} + 2\xi\omega_n (\dot{x} - \dot{y}) + \omega_n^2 (x - y) = 0$$

where:
$\ddot{x}$ is the absolute acceleration of the mass
$\dot{x}$ is the absolute velocity of the mass
$x$ is the absolute displacement of the mass
$\dot{y}$ is the absolute velocity of the base
$y$ is the absolute displacement of the base
$\omega_n$ is the natural frequency of the system
$\xi$ is the percent of critical damping A typical time history acceleration response of system $\omega_n$ may, for example, respond to a half-sine shock pulse of period $t$. The response is considered in two parts, i.e., the maximum response which occurs during the time duration, $t$, of the input and the maximum response which occurs after the duration of the input. The former is called the primary and the latter is called residual spectrum. Residual responses are free vibrations since the excitation is over when they occur.

Shock spectrum may now be defined as the primary and residual points plotted as a function of the natural frequency of the system over a broad frequency range.

In the low frequency range the shock spectrum curves are proportional to a constant velocity line. The velocity (relative velocity between the mass and its support) is the area under the input acceleration curve $\ddot{y}$. In this frequency region the shock pulse may be considered to be an impulse or an instantaneous velocity change and the area of the acceleration time history is the governing parameter because of the inertia of the mass spring system.

A response spectrum is a measure of the shock transient only in a very restricted sense. There does exist a one-to-one correspondence between the absolute value of the Fourier spectrum of the transient in the undamped residual spectrum, but no such relation exists for total spectrum. Even for the case of a defined undamped residual spectrum, it is not possible to define the shock transient (or its complex Fourier spectrum) since no phase information is available.

Heretofore, little attention has been given to the problem of determining the transient time functions that will yield given response spectra versus frequency patterns. Nevertheless, there has existed a real need to devise laboratory environmental shock tests whose response spectra would follow some desired variation over the frequency range of interest. As mentioned hereinabove, prior to this invention this need has been side-stepped by employing shock test machines to produce a time function that approximates a classical pulse shape (such as a half-sine, triangular, or square pulse). The response spectra associated with these "classical" pulses are well known and by making the pulse amplitude great enough, a sufficiently-severe test can be achieved.

There are a number of disadvantages associated with using classical pulse tests and among them is the limited control over shaping the spectrum contour. As a result, excessive response levels must usually exist at certain frequencies in order to assure sufficiently high levels at other frequencies.

Electromagnetic vibration shake tables have been sufficiently refined, that some interest has been directed to their use for shock testing. For convenience and brevity throughout the following description, the term "shaker" will be used to indicate an electrodynamic shake table. Originally, primary interest centered on using shakers to obtain classical pulses, but more recently the emphasis has been on producing rather complicated oscillatory shock transients that are similar to those measured in flight vehicles. To this end, it is highly desirable to devise a method for defining oscillatory transients that will produce a desired spectral pattern. In particular, assuming that a shaker can produce a mechanical input transient to the test specimen with limited distortion, it is desirable to not only define a suitable shock transient but also to produce it in the form of electrical input signals to the shaker.

The present invention represents an improvement over prior art shock spectrum equipment and especially over the shock spectrum analysis and synthesis method and apparatus described in copending application Ser. No. 715,399 entitled Shock Spectrum Analysis and Synthesis Method and Apparatus, filed on Mar. 22, 1968 and assigned to the same assignee as the present application. The analyzer of the above identified application and other prior art analyzers are capable of analyzing only one channel with a single frequency at a time. As a result in using these prior art analyzers it was necessary to subject the test specimen to a large number of shocks (approximately up to 80 or more) each at a different frequency. This procedure is very time consuming and laborious. Furthermore and very importantly, because of the large number of shocks to which the specimen is subjected, there is a great possibility of damaging the specimen. In the analyzer of the present invention the specimen can be subjected to a multiplicity of different shock frequencies on a single shock transient in a matter of seconds. This capability greatly shortens the testing time and reduces the potential for damaging the specimen. Also, the analyzer of the present invention has a logarithmic converter integral therewith whereas prior systems required the purchase of a logarithmic converter as a separate piece of equipment. Another feature of the present analyzer is the ability to view an analyzed output on an oscilloscope prior to plotting on an $x - y$ plotter whereas in prior systems these functions were performed simultaneously so that every output initiated a plotted graph even if the particular output was not of particular interest.

The synthesis system of the present invention has a number of advantages and features not present in prior art synthesizers. In addition to utilizing separate oscillators for generating the different frequencies, rather than filters as used by some prior art synthesizers, an improved gating technique is used to provide a more efficient utilization of the shaker amplifier power capabilities. Ideally all frequencies should be gated on and off simultaneously. However, the power requirements for the shaker amplifier to handle extremely high accelerations required by shock spectrum specifications in the high frequency region are prohibitive. Therefore, the synthesizer of the present invention utilizes a gating technique which minimizes the shaker amplifier power requirements. Together with the gating technique the timing system of the synthesizer of the present invention allows the exact number of cycles from the synthesizer that are necessary to build up the response to the proper level for the analyzer. This also means that the shaker amplifier requires less power; thereby, increasing the efficiency of the shaker amplifier for a given level of input power as compared to prior art systems. In prior synthesizers using filters to provide the frequencies there is no control over the number of cycles since this is controlled by the dissipative or damping factor Q, of the filters. Therefore those systems employing filters obtain a constant number of cycles which means that at a high Q, for example 50, enough energy must be pumped into the shaker amplifier to obtain the required response from the analyzer. The efficiency of such systems is considerably lower than that of the present invention as shown by actual tests conducted.

Another advantage of the present invention is that the number of settings for providing the correct timing has been greatly reduced thus decreasing the time required for making these settings and the possible setting errors. Also, the timing in the present invention is matched exactly for both the synthesizer and analyzer, whereas this cannot be accomplished in the prior art systems employing filters.

The above objects, advantages, and features of the shock spectrum synthesis capabilities of the present invention, as well as others, are achieved by providing a method of producing an electrical transient having a response spectrum corresponding to a desired pattern over a given frequency range, comprising the steps of: simultaneously generating a plurality of steady state electrical oscillating waves each having a different frequency; summing a predetermined number of the lowest frequency waves; sequentially gating each of the remaining oscillating waves in an order corresponding to the higher frequencies first for a predetermined time; and summing all of the waves thereby producing the desired electrical transient.

The objects, advantages and features of the shock spectrum synthesis system of the present invention as well as others, are achieved by providing an apparatus for producing an electrical transient waveform having a given response spectrum comprising: means for simultaneously generating a plurality of steady state electrical oscillating waves, each of the waves having a different frequency; means for summing a predetermined number of the lowest frequency waves for a predetermined time; means for sequentially gating each of the remaining oscillating waves in an order corresponding to the higher frequencies first for a predetermined time; and means for summing all of the waves thereby producing the desired electrical transient.

The shock spectrum analysis capabilities of the present invention are accomplished by providing a method of analyzing an electrical transient having a response spectrum over a given frequency range, comprising the steps of: applying an input acceleration to a test specimen; producing an electrical signal representing the acceleration; computing the responses of a plurality of single-degree-of-freedom mass spring damping systems of a plurality of specified natural frequencies to that acceleration; automatically incrementing the responses of such single-degree-of-freedom mass spring damping systems to other natural frequencies for analysis; sampling the peak responses; and displaying the peak values of the responses.

More particularly, the shock spectrum analyzer of the present invention comprises an apparatus for analyzing an electrical transient having a response spectrum over a given frequency range, comprising: means for applying an input acceleration to a test specimen; means for providing a signal representing the acceleration; means for computing the responses of a plurality of single-degree-of-freedom mass spring damping systems of a plurality of natural frequencies to that acceleration; means for automatically incrementing the responses of such single-degree-of-freedom mass spring damping systems to other natural frequencies for analysis; means for sampling the peak values of the computed responses; and means for displaying the peak values of the responses.

Other objects of the invention will in part be obvious and will in part appear hereinafter. The invention accordingly comprises the method involving the several steps and the relation and order of one or more of such steps with respect to each of the others, and the apparatus possessing the features, properties and relation of elements which are exemplified in the following detailed disclosure and the scope of the application all of which will be indicated in the claims.

For a fuller understanding of the nature and objects of the present invention reference should be had to the following detailed description taken in connection with the accompanying drawings wherein:

FIG. 4 shows a more detailed diagram of each of the computing loop circuits shown in the analyzer of FIG. 3;

FIG. 6 shows a more detailed diagram of the input start circuit shown in FIG. 3; and FIG. 7 shows a more detailed diagram of the scan timer circuit and the scanner of FIGS. 2 and 3.

Figure 1:
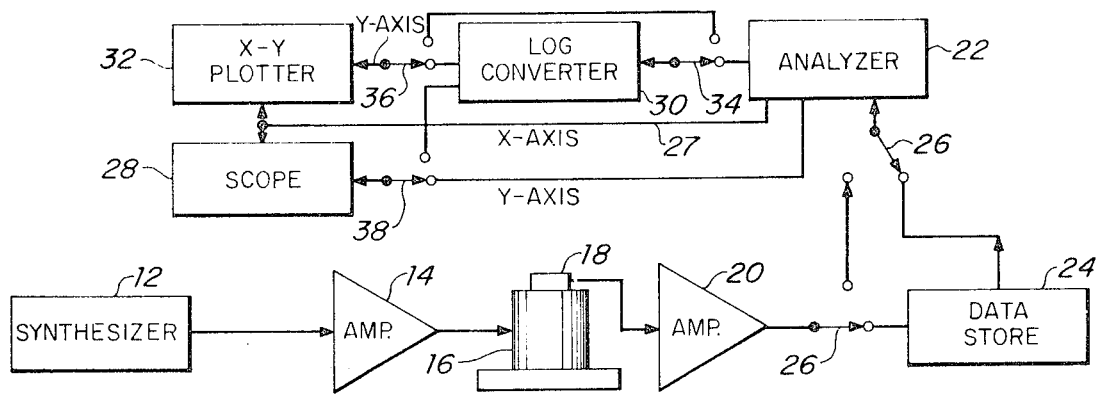
FIG. 1 shows the shock spectrum analysis and synthesis system for carrying out the method of the present invention.

FIG. 1 shows a block diagram of the shock spectrum analysis and synthesis system of the present invention. The shock spectrum analysis and synthesis system 10 includes a shock spectrum synthesizer 12. The output of the synthesizer 12 is connected to a shaker amplifier 14 whose output, which is a complex transient waveform, is applied to a shake table 16 which may be a conventional electrodynamic shaker. On the shake table 16, or at a point on the test specimen considered to be the point of application of the shock input, is mounted an accelerometer 18 which senses the motion transient. The output from the accelerometer 18 is applied to a signal conditioning amplifier 20. The output from the amplifier 20 either is applied directly to a shock spectrum analyzer 22 or indirectly to the analyzer 22 via a data storage unit 24 as shown by the appropriate switches 26. The data storage system 24 may be a recording tape loop on which the desired test sequence is recorded. The amplifier 20 matches the output of the accelerometer 18 to the input of either the analyzer 22 or the data storage unit 24 depending on whether or not the data storage system is employed. Connected to one output referred to as the peak output of the analyzer 22 is a logarithmic converter 30 which is shown as a separate block from the analyzer 22 but in fact is integrally built into the analyzer. The output of the converter 30 may be applied to a monitoring oscilloscope 28 or an X-Y plotter 32. A direct output via line 27 from the analyzer 22 is applied to the X-axis of the plotter 32 and also to scope 28. Switches 34 and 36 permit the Y-axis signal from analyzer 22 to pass directly to plotter 32 or indirectly through converter 30. A switch 38 permits the Y-axis signal to be applied directly to scope 28 or indirectly through converter 30 if the signal is logarithmic. The signals may be fed to the scope 28 for a visual reading before the plotter 32 is made operative.

The synthesizer 12 of the system 10 generates a variable transient electrical input to the vibration shake table 16. The accelerometer 18, which in the embodiment of FIG. 1 is mounted on the shake table 16, detects the mechanical acceleration generated by the table and the accelerometer signal after proper conditioning is applied to the input of the analyzer 22. Therefore, the transfer function of the shake table 16 and the mechanical feedback for the test specimens are included in the system. Repetitive low level inputs are applied and analyzed in 1/6 octave steps until a complete spectrum is plotted. The system is equalized until the plotted spectrum shape matches the desired spectrum shapes. Then full input is applied once, and is recorded on magnetic tape. The analyzer 22 is then removed from the system and is used to analyze the taped data. The test specimen is required to sustain only one shock input at full level. The desired spectrum might be generated according to g, the acceleration due to gravity defined as one $g = 386$ in/sec.$^2$, peak vs.$\omega_n$ data, or to match analyzer data computed from an actual complex shock which might result, for example, from a pyrotechnic event.

SYNTHESIZER

The operation of the synthesizer 12 is based upon the transient response of a single-degree-of-freedom system to a sinusoidal input. For example, if the system has a natural frequency of 100 Hz, with a Q of 10, a 10 g input oscillation will evoke a 100 g response at resonance, provided the transient oscillation lasted long enough for the response to reach steady state (approximately 10 cycles) and then was turned off. At the input frequencies above the natural or resonant frequency, the response would be less than the input acceleration as in conventional vibration isolation theory. For input frequencies below the resonant frequency the response acceleration would be equal to the input acceleration. Thus, a single-degree-of-freedom system will selectively respond to an input vibration whose frequency coincides with the natural frequency of the excited system. The synthesizer generates thirty steady state sinusoids starting at approximately 12.5 Hz and increasing in 1/3 octave steps to 10KHz. By "steady state" is meant each of the frequency components reach a maximum steady state level in that they exist for a number of cycles, such as for example 10 or more cycles. This is in contrast to "transient" synthesis systems where the maximum component or value of any frequency is reached and exists only momentarily. The embodiment of the synthesizer 12 shown in FIG. 2 employs 30 variable oscillators divided into three decades A, B and C. Decade A includes ten oscillators 40 starting with the first oscillator at 12.5 Hz and increasing in 1/3 octave steps to 100 Hz. Decade B includes ten oscillators 42 beginning at 126 Hz up to 1 KHz. Finally, decade C includes 10 oscillators 44 with the first beginning at 1,260 Hz up to 10 KHz. Each of the oscillators has separate gain control provided by potentiometers 48 connected to the output of each oscillator. The gain control provided by each of the potentiometers 48 has a 0.1 percent resetability. The outputs of each of the potentiometers 48 in decade A are connected in parallel within the decade.

The output each of the oscillators 40 in decade A are connected in parallel to a summing circuit 50. Each of the outputs from the oscillators 42 in decade B is separately connected to an individual amplifier 52 and the outputs of each of the oscillators 44 in decade C is separately connected to an individual amplifier 54. The outputs from summing amplifier 50 and from each of the individual amplifiers 52 and 54 are each connected to separate gating circuits 56. Each of the gating circuits 56 has connected to its input a timing signal provided from a timing circuit labelled 62. The timing circuit 62 which will be described in greater detail in conjunction with FIG. 4, applies signals in a predetermined timing sequence to gating circuits 56.

The outputs from the gating circuits 56 are all connected to a summing circuit 76 which includes a plurality of resistors 78 connected in parallel thereacross. Resistors 78 establish the fixed output levels of the synthesizer. Each resistor 78 is selectable by a front panel switch 80 which allows selection of the particular gain desired and the desired selection is connected to a shaker drive amplifier 86. The output from the shaker drive amplifier 86 is connected to the shaker power amplifier 14 shown in FIG. 1.

The synthesizer 12 provides a plurality of leveled sinusoids which are gated, amplified, and summed in such a manner so as to produce a single synthesizer input transient to the shaker power amplifier 14. The synthesizer is a means for actively shaping and controlling such inputs necessary to generate a specified shock spectrum at the shaker head. The output transient of the synthesizer 12 can be programmed for single shocks or may run freely at an adjustable rate. The basic period of the transient may be, for example, one second, with the period of each decade adjustable with respect to the basic period. In order to avoid overtesting and fatigue at the higher frequencies, the on periods of higher frequency decades are proportionally shorter. The 30 sinusoids are divided into two separate groups: (1) frequencies from 12.5 Hz to 100 Hz in decade A, and (2) frequencies from 125 Hz to 10 KHz in decades B and C. The first group of frequencies produced by oscillators 40 in decade A are all summed together simultaneously in summing amplifier 50 and are gated by corresponding circuit 56 for a predetermined time determined by timing circuit 62. The maximum gating time assures proper buildup of the 40 Hz response. Frequencies below 40 Hz do not have sufficient time to build up to a peak response. However, this does not present any problem for obtaining a proper spectrum at the lower frequencies. Frequencies above 40 Hz have more than ample time to build up to a proper response. The second group of frequencies produced by oscillators 42 and 44 of decades B and C respectively are amplified separately by individual amplifiers 52 and 54 respectively and gated sequentially by corresponding gating circuits 56 in an order corresponding to the higher frequencies first for a predetermined time determined by timing circuitry shown in dashed block 62.

The timing circuitry includes a pulser 64, a scan timer circuit 66 and a scanner 68. Pulser 64 may be any one of a number of configurations for providing pulses for initiating operation of timing circuitry 62. The output of pulser 64 is connected to the scan timer circuit 66 which controls the timing which the scanner 68 follows to provide the sequential gating on of gates 56. The details of the scan timer circuit 66 and scanner 68 will be described in greater detail in conjunction with FIG. 7. The maximum gate time assures proper buildup of all frequencies. Ideally, all frequencies should be gated on and off simultaneously. However, the power requirements of the shaker amplifier 14 to handle extremely high accelerations required by shock spectrum specifications in the high frequency region are prohibitive. Hence, to minimize the shaker amplifier power requirements, the transient oscillations in the second group of frequencies in decades B and C are fed to the shaker sequentially in the manner described rather than simultaneously. The first group of frequencies in decade A is then summed together in amplifier 76 with the twenty sequentially gated frequencies in decades B and C and then fed to shaker drive amplifier 86 for proper amplification and drive capabilities for the output transient to be applied to shaker amplifier 14 in FIG. 1.

Equalization in synthesizer 12 is accomplished by test procedures, not trail and error, as in some prior art systems. All level controls are zeroed and then proportional settings are made for each frequency output starting with the lowest to the highest. In order to correct for any interaction between adjacent frequencies, a second pass may be made from the lowest to the highest frequencies. The second pass should produce less then a 10 percent variation from the desired spectrum and, if necessary, a third pass from lowest to highest will further reduce this variation. The levels are set using the potentiometers 48 which are ten turn 1/10 percent linearity precision locking potentiometers with an integral readout providing 1/10 percent resetability.

ANALYZER

Analyzer 22 (which will be described in further detail later) is a special purpose analog computer designed to simultaneously solve the following differential equation for a plurality of single-degree-of-freedom mass spring damping systems:

$$\ddot{x} \ 30 \ 2\xi \ \omega_n \ (\dot{x} - \dot{y}) + 107_n{}^2 \ (x - y) = 0 \tag{1}$$

where:
$\ddot{x}$ is the absolute acceleration of the mass
$\dot{x}$ is the absolute velocity of the mass
$x$ is the absolute displacement of the mass
$\dot{y}$ is the absolute velocity of the base
$y$ is the absolute displacement of the base
$\omega_n$ is the natural frequency of the particular system
$\xi$ is the percent of critical damping The forcing function for the above differential equation is the acceleration of the base, $\ddot{y}$. The maximum responses of $\ddot{x}$ during and after the shock pulse respectively, when plotted as a function of natural frequency, are the primary and residual spectra of the transient input. The analyzer 22 employs a series of networks and solid-state operational amplifier modules.

Figure 3:
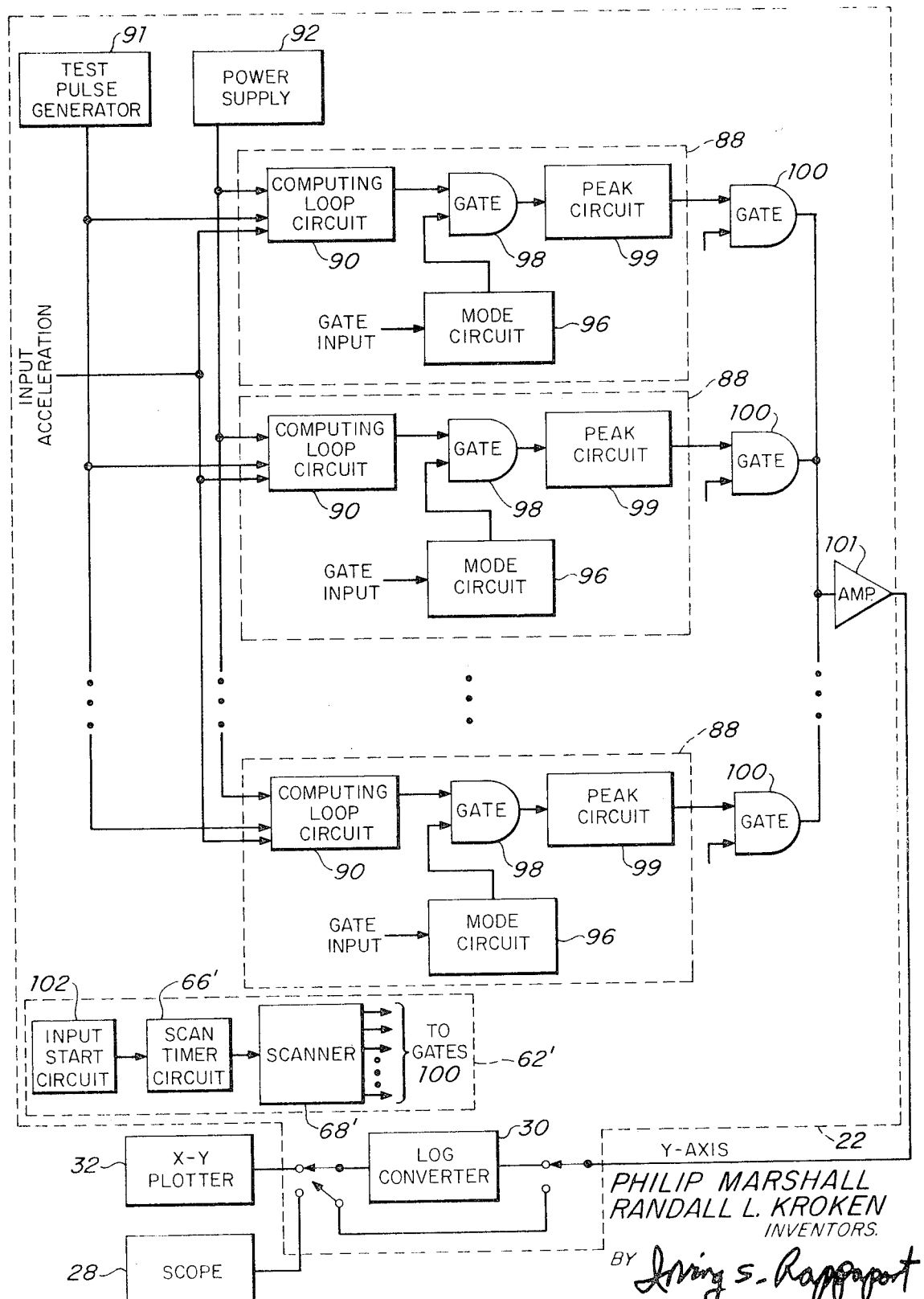
FIG. 3 is a block diagram of the shock spectrum analyzer shown in FIG. 1.

FIG. 3 shows a block diagram of the shock spectrum analyzer 22 shown in FIG. 1. The input to the analyzer which is an input acceleration is applied to a plurality of analyzing circuits, each of which is shown in dashed blocks 88. Each of the analyzing circuits or channels 88 is designed to analyze a different shock frequency. Each circuit 88 includes a computing loop circuit 90 to which the input acceleration is applied. Also applied to the input of each computing loop circuit 90 is a test pulse from a test pulse generator 91 which is used for calibrating the analyzer 22. A power supply 92 provides the necessary power to operate the analyzer 22 and is connected to each of the computing loops 90.

Within each circuit 88 is also provided a mode circuit 96 for selecting the particular mode of operation of the analyzer. The mode circuit 96 has a gate input applied thereto and the output of the mode circuit 96 is connected to a gate 98. Also connected to the The 98 is the output from the computing loop circuit 90. The output from gate 98 is connected to a peak circuit 99. The output from each of the peak circuits 99 is connected to a corresponding gate 100. Also connected to each of the gates 100 is an output from a timing 62 which will be described in greater detail in conjunction with FIG. 7. The outputs of all the gates 100 are connected to a single amplifier 101. The output from amplifier 101 may be connected by a switch directly to log converter 30 or to scope 28. The output of log converter 30 may be connected by a switch either to X–Y plotter 32 or to scope 28.

The analyzer 22 is constructed to compute the shock spectrum of a transient pulse in either one-third of one-sixth octave steps over the frequency range of 12.5 Hz to 10 KHz. The signal to be analyzed may come from an FM tape recorder as may be contained in data store 24 in FIG. 1 or from a conditioned accelerometer output to analyze the shock information while the test is in process.

Although the prime use of the analyzer is to do transient analysis it will also respond as a single-degree-of-freedom mass-spring-damper system to a steady state input. This means that for a steady-state sine input, the acceleration output of the analyzer will be Q times the input at the frequency of the input. This property makes the analyzer useful in determining the frequency content of noise. It is possible to sweep steady-state noise to find dominant frequencies in the noise since the analyzer will multiply any steady-state input at $\omega_n$ by Q. The damping factor Q is selected in fixed steps of 10, 20, 30, 40 and 50.

Analyzer 22 is basically a special purpose analog computer designed to simultaneously compute the second-order differential equation of motion for a plurality of single-degree-of-freedom mass spring damping systems having a plurality of natural frequencies. Its output is the peak response of the absolute acceleration of the mass, and is displayed in either an analog or log presentation. The analyzer presents to the user numerous ways of extracting from the shock transient that information which is useful in every respect. It may be programmed to function in three different modes: (1) automatic, (2) manual, and (3) individual selection of channels. In the automatic mode upon receipt of an input shock transient of a predetermined magnitude, each of the channels 88 simultaneously analyze the input shock transient by computing the responses of plurality of single-degree-of-freedom mass spring damping systems of a plurality of natural frequencies to the input acceleration. Mode circuit 96 conditions gate 98 which serves as a primary-residual gate to accept the composite portion of the accelerated response. All output signals from gates 100 are sequentially gated, as determined by timing circuits shown in the dashed block 62' to the X–Y plotter 32 and scope 28 via amplifier 101. Timing circuit 62' for analyzer 22 comprises an input start circuit 102 which will be described in FIG. 6, whose output is connected to scan timer circuit 66', which is substantially the same as scan timer circuit 66 in FIG. 2 and whose output is connected to a scanner 68' which is the same as scanner 68 in FIG. 2. The entire analysis by all channels of a single input shock transient consumes only approximately 20 seconds. In the manual mode of operation the plotter 32 is not automatically activated but must be done so manually. In the individual channel selection mode, each channel whose output is to be displayed is selected and as in the manual mode the activation of plotter 32 is manually initiated. Analyzer 22 computes the entire shock response at each frequency. The operator has a choice of selecting for display the D-C peak response, in either: (1) the positive direction; (2) the negative direction; or, (32the positive or negative direction whichever is greatest. This is done by using a three position switch located on the front panel.

The analyzer includes a gating feature to allow the primary, residual or composite spectra to be displayed. This separate analysis of the primary and residual spectra may be accomplished by an external gating signal which may be used to inhibit the peak circuit 100 during or after the input transient. The input to the analyzer 22 is an excitation forcing function which is the acceleration of the base $\ddot{y}$. This signal may be obtained from the accelerometer 18 of the shake table 16 or from the data processing unit 24 in the form of a tape recorder. The analyzer 22 does not require specific input leveling since it is linear over a wide dynamic range and input may be leveled to the best utilization of that dynamic range. Signals from the output of the analyzer 22 representing the time history of the acceleration of the sprung mass are visually displayed on the scope 28. In addition, the analyzer may be utilized with X–Y plotter 32 and a voltage proportional to log frequency is made available to drive the X-axis on the plotter The signals representing the maximum values of the signals are displayed on the U-axis through the logarithmic converter 30.

FIG. 4 is a block diagram of a computing loop circuit 90 shown in FIG. 3. Applied to the input 103 of the computing loop circuit 90 is an input forcing function $+\ddot{y}$. The signs of the signals are independent of mathematical operation and refer only to operational amplifier characteristics. This input is applied to a summer amplifier 104 which serves to isolate the analyzer 22 from the shock source. The output from the amplifier 104 is applied to a summing amplifier 108 which sums with unity gain all the terms of the differential equation (1) above. The inputs to the amplifier 108 are: $+\ddot{Y} + 2\xi\omega_n \dot{z} + \omega_n^2 z$ and the output of amplifier 108 is $\ddot{z}$ where $\ddot{z}$ is defined as the relative acceleration between the base and the sprung mass, $(\ddot{x}-\ddot{y})$, and $\dot{z}$ is the relative velocity between the base and the sprung mass, $(\dot{x}-\dot{y})$ and $z$ is the relative displacement between the base and the sprung mass, $(x-y)$.

The input $\ddot{y}$, is also applied to a summer-inverter 110 having unity gain. The output from the summing amplifier 108, which is $+\ddot{z}$, is applied to a coefficient potentiometer 112 and to the input of the summer-inverter 110. Since $\omega_n$ is a coefficient of Equation (1), it is represented by a constant equal to 0.125 to 1.0 in precision resistors and ganged tracked precision potentiometers for vernier frequency control. The output from the coefficient potentiometer 112 is $\omega_n\ddot{z}$. The $\omega_n\ddot{z}$ output from the potentiometer 112 is applied to integrator 114 whose integrating resistor and capacitor (not shown) are chosen to make its gain unity when $\omega_n = 1/RC$. The output of the integrator 114 is $-\omega_n \dot{z}$ and is applied to a buffer inverter 116 with unity gain. The output of the integrator 114 lags the input in phase by 90°. The output signal $\omega_n \dot{z}$ from buffer 116 represents $\omega_n$ times the relative velocity of the sprung mass with respect to the base. This signal is operated on by a damping potentiometer 118 having a coefficient of $2\xi$ where Q is equal to $1/2\xi$ and $\xi$ is defined as the percent of critical damping. Since $2\xi$ is a coefficient of Equation (1), $1/2\xi = Q$ is generated by a series of voltage dividers to established a fixed Q. The output of the $2\xi$ potentiometer 118 is $+ 2\xi\omega_n \dot{z}$ and is applied as feedback to the summer-amplifier 104.

The output from the integrator 114 is also applied to $\omega_{n2}$ coefficient potentiometer 120 which is identical with and tracks $\omega_{n1}$ coefficient potentiometer 112. The output of the potentiometer 120 is $-\omega_n^2 \dot{z}$ and is applied to an integrator 122 which is identical with and tracks integrator 114. The output of integrator 122 is $+\omega_n^2$ and represents $\omega_n^2$ times the relative displacement between the sprung mass and the base. This relative displacement signal $+\omega_n^2 z$ is used to close the loop of the computing circuit 90 and applied to summer amplifier 104.

The output of the summer-inverter 110 is the negative of the time history of the absolute acceleration of the sprung mass, $\ddot{x}$. This time history of the acceleration $-\ddot{x}$ is an acceleration output of the computing loop circuit 90 and is applied to the peak circuit 99 through the gate 98 as shown in FIG. 3 which is an FET transistor.

Figure 5:
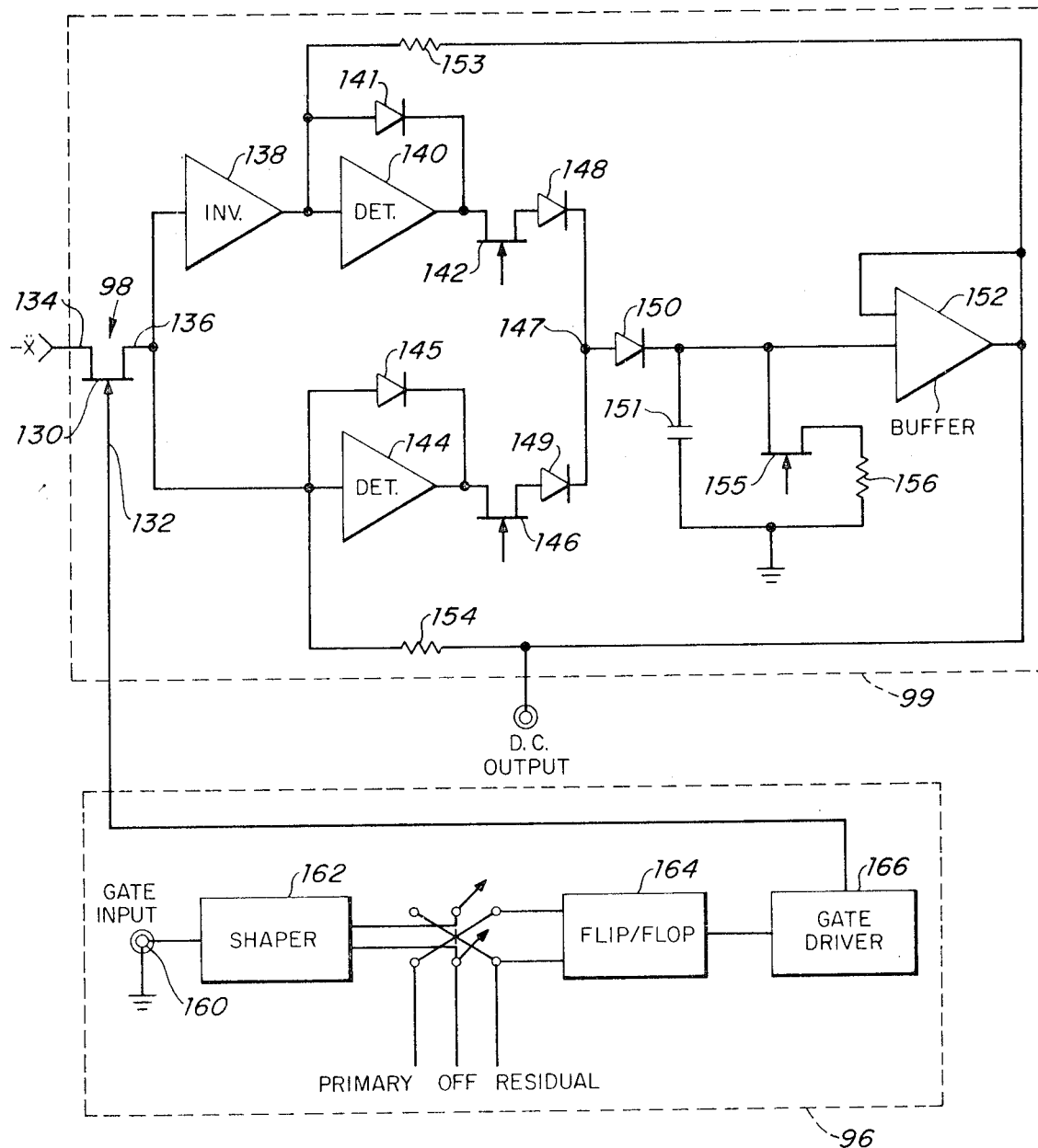
FIG. 5 is a more detailed diagram of the peak and mode circuits of the analyzer of FIG. 3.

FIG. 5 shows a block diagram of each of the peak circuits 99 and the mode circuits 96 shown in FIG. 3. The peak circuits 99 are designed to accept the gated negative acceleration histories from the corresponding computing loops and provide a DC signal proportional to the maximum peak response relative to the base. The acceleration output from the computing loop circuit 90, $+\ddot{x}$, is applied to the gate 98 which is shown in FIG. 5 as a field-effect transistor 130 having a gate electrode 132, a drain electrode 134 and a source electrode 136. The output from the mode circuit 96 is applied to the gate electrode 132 of the transistor 130. The source electrode 136 of the transistor 130 is connected to an inverter 138. Inverter 138 is a buffer-inverter with unity gain which accepts the gated negative acceleration history and inverts it to a positive acceleration. The output of inverter 138 is connected to a detector 140. A diode 141 is connected across detector 140 and serves to convert the AC signal to a DC signal.

Detector 140 accepts the inverted gated history and detects the maximum positive peak of $\ddot{x}$. The detector has unity gain to the positive peak which is insured by the provision of a variable potentiometer (not shown) to compensate for any losses. The output of detector 140 is connected to a switch in the form of an FET transistor switch 142 when the positive spectrum is desired is closed by applying a pulse to its gate electrode, allowing the positive peak DC voltage to pass to the holding or storage circuit which will be described. The source electrode 136 of FET transistor 130 is connected to a detector 144 which is used to detect the maximum negative peak of the computed negative acceleration history. A diode 145 is connected across detector 144 and serves to convert the AC signal to a DC signal. Since the gated acceleration is presented to peak circuit 99 in a negative state it is not necessary to provide detector 144 with an inverter. Detectors 140 and 144 function identically. The output of detector 144 is connected to an FET transistor switch 146 so that when the negative spectrum is required, switch 146 is closed by applying a pulse to its gate electrode allowing the positive DC signal of the negative peak response of the acceleration to pass to the holding circuit.

The source electrodes of switches 142 and 146 are each connected to a junction 147 via diodes 148 and 149 respectively. Diodes 148 and 149 provide isolation between detectors 140 and 144. Connected to junction 147 is a diode 150, which the DC peak response of the selected spectrum passes through to charge a capacitor 151 to the peak DC voltage proportional to the peak response. Diode 150 and capacitor 151 are connected to an operational amplifier 152 which is a voltage follower and acts as a buffer to displaying of the DC peak response. The output of amplifier 152 is connected through a feedback loop via resistors 153 and 154 to the input of detectors 140 and 144 respectively. The output from amplifier 152 is used to display the peak response on X-Y plotter 32 and scope 28 in FIG. 3.

Once the peak response has been sampled it must be stored long enough to be displayed. This is accomplished by the operation of diode 150, capacitor 151 and amplifier 152. Diode 150 is a diode with very low forward bias and extremely high reverse bias in order to eliminate any discharge of capacitor 151 back into detectors 140 and 144. Capacitor 151 may be a high quality polystyrene capacitor whose dielectric resistance is very high preventing a discharge path of capacitor 151 to ground. The input impedance of amplifier 152 is quite high (in order of $10^{12}$ megohms), making it an excellent barrier between amplifier 152 and capacitor 151.

Once the peak response stored by buffer amplifier 152 has been displayed, that stored response must be emptied to allow new data to be processed. This is accomplished by the provision of an FET transistor switch 155 connected in parallel with capacitor 151 between the input to amplifier 152 and ground via a resistor 156. When it is desired to empty the buffer amplifier, a peak reset pulse is applied to the gate electrode of switch 155 to close the switch thus discharging capacitor 151 through resistor 156 to ground. Once this peak reset pulse is terminated, switch 155 opens permitting capacitor 155 to be recharged by the next peak response. Since it is impossible to achieve complete isolation for capacitor 155, there is a decay of the stored peak response, but the time required for displaying the response renders the decay to be negligible.

In the operation of the mode circuit 96, the transistor 130 which is a field-effect transistor acts as a gate to any signal entering the peak circuit inverter 138. A gate input is applied at terminal 160 and is then amplified and differentiated in a shaper circuit 162 to produce two negative pulses. The first negative pulse is at the leading edge and the second at the trailing edge of the gate input. These two negative pulses are used for triggering flip flop circuit 164. The output of the flip flop circuit 164 drives a gate driver circuit 166 which in turn drives the gate electrode 132 of the field-effect transistor 130. The inversion of the position in time of the set and reset pulses to the flip flop circuit 164 produces the residual and primary effects as desired. In the off position, flip flop circuit 164 is set such that gating transistor 130 is connected from drain electrode 134 to source electrode 136.

The test pulse generator 91 shown in FIG. 3 includes a monostable multivibrator which is actuated by a step input from a mercury-wetted relay which is energized by depressing a push-button switch (none of which are shown). The mercury-wetted relay insures a single pulse for each switch depression. The square pulse generated is applied to the input of each computing loop circuit 90.

Timing Circuitry

FIG. 6 is a more detailed diagram of the input start circuit 102 of the analyzer shown in FIG. 3. The operation of timing circuit 62' of analyzer may be initiated automatically. This is accomplished by a pair of differential voltage comparators 182 and 184 and a dual nand gate made up of an OR gate 186 in series with an AND gate 188. Connected to an input of each of comparators 182 and 184 is the input signal which is a pulse which if greater than ± 50 mv in magnitude will initiate operation. Connected to another input of comparator 182 is a negative reference voltage, −V, while a positive reference voltage, +V, is connected to an input of comparator 184. The outputs of comparators 182 and 184 are connected to OR gate 186 whose output is connected to one input of AND gate 188. The other input of AND gate 188 is connected to ground. The output of and gate 188 is connected to the input of scan timer circuit 66. With the two comparators 182 and 184 referenced to negative and positive potentials respectively, depending upon the polarity of the input pulse, when the reference level is exceeded by the input pulse, the corresponding comparator will provide an output. Upon the triggering of an output from either comparator, OR gate 186 will provide an output signal to AND gate 188 whose output conditions the scan timer circuit 66' as will later be described.

Figure 2:
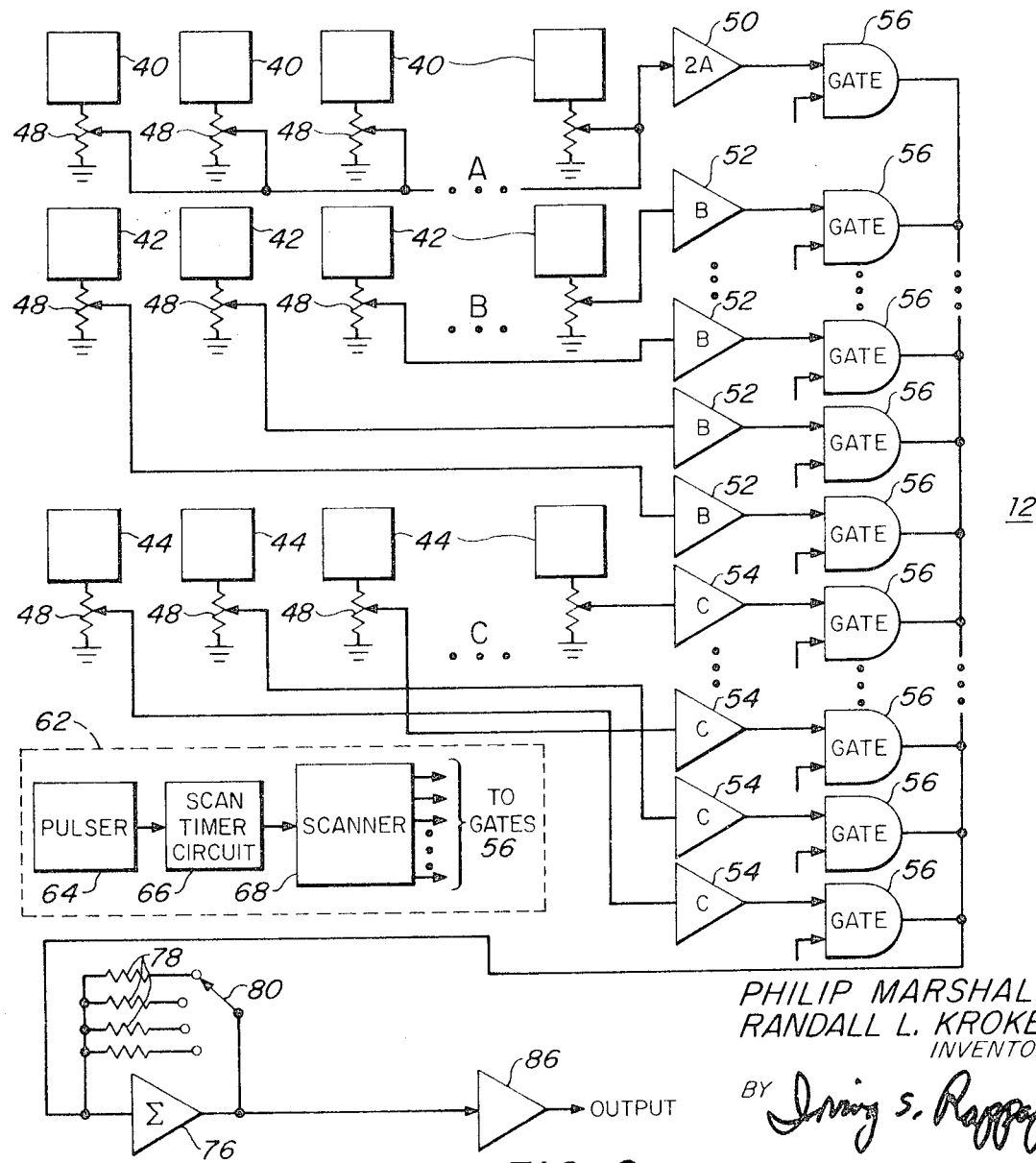
FIG. 2 illustrates a block diagram of the shock spectrum synthesizer shown in FIG. 1.

FIG. 7 is a more detailed diagram of the scan timer circuit 66 and the scanner 68 shown in FIG. 2. Except for one small difference, which will be explained, the scan timer 66' and scanner 68' of analyzer 22 in FIG. 3 are identical to their counterparts 66 and 68 respectively in the synthesizer of FIG. 2. The operation of the scan timer circuit 66 may be initiated manually such as by a button 180 or automatically such as by any standard pulser 64. The operation of button 180 or the output of pulser 64 are connected to a flip-flop 190 to correctly condition or set the scan timer circuit 66 for proper operation. The output of flip-flop 190 may be connected via switch 191 to any one of five resistors 192, connected in parallel at one end and each of a different resistance value corresponding to the five different Q settings for the system. The output of resistors 192 is connected to a ramp generator 194 having a feedback loop including a capacitor 196. The selected resistor 192 and capacitor 196 control the slope of the generated ramp. The output of generator 194 is connected to the input of the scanner 68 which comprises a plurality of comparators 198 each of which is connected in series with a corresponding driver circuit 200 of any well known design. Also connected to the input of each of the comparators 198 is a reference voltage, $V_{ref}$, whose value to each comparator is determined by a resistive divider network made up of resistors 202 connected to one another in series at junctions 204. The output of each of the driver circuits 200 is connected to one input of a corresponding gate 56 in FIG. 2. There is a separate comparator 198 and driver circuit 200 corresponding to each gate 56.

The only difference between scan timer circuits 66 and 66' is that scan timer circuits 66' of analyzer 22 employs only two resistors 192, each of which is chosen to provide a different scan speed depending upon whether the plotter 32 or the scope 28 is being employed. The value of one such resistor 192 is chosen to provide a slow scan (approximately 20 to 30 seconds for the entire spectrum analysis) for the plotter presentation. The value of the other resistor 192 is chosen to provide a fast scan (approximately 50 milliseconds for the entire spectrum analysis) for the scope presentation. The scanner 68' is identical to scanner 68 except that the outputs of driver circuits 200 in scanner 68' are connected to their corresponding gates 100 shown in FIG. 3.

In the operation of the scan timer circuit 66 and scanner 68, when flip-flop 190 is set by button 180 or pulser 64, generator 194 begins to generate a negative ramp. Each comparator 198 is referenced to the ramp by a resistive difference provided by resistors 202. The ramp is applied to all the comparators simultaneously. As the amplitude value of the ramp coincides with the reference voltage of each comparator 198, the corresponding driving circuit 200 is fired thereby initiating sequential operation of gates 56 of synthesizer 12 in the described sequence. Scan timer circuit 66' and scanner 68' operate in substantially the same manner to initiate sequential operation of gates 100 of analyzer 22.

Operation

The operation of the combined shock spectrum analysis and synthesis system shown in FIG. 1 is as follows. The shock spectrum which it is desired to synthesize is plotted on the X–Y plotter 32 after the system has been calibrated. Then the shake table 16 is energized and the shaker gain set to some defined value. Then the analyzer 22 is adjusted to the lowest frequency where an input is demanded by the desired spectrum. Then repetitive inputs are applied from the synthesizer 12 increasing the level at that frequency until the desired level is reached as indicated by the plotted spectrum. The potentiometer 48 connected to the output of the lowest frequency oscillator 40 in decade A is adjusted to the desired acceleration level of the desired spectrum on the plotter 32. Then the analyzer 22 is advanced to the next ⅓ octave step and the potentiometer is adjusted which corresponds to that frequency. This process of applying the repetitive inputs from the synthesizer 12 is repeated until the entire desired spectrum has been synthesized. The timing for each of the decades A, B and C is determined by the desired number of cycles required at the lowest frequency in the particular decade. As described the frequencies in decade A are all summed together and then the frequencies in decades B and C are sequentially gated through gates 56 in the manner described and in an order of frequencies beginning from the higher frequencies first down to the lower frequencies. Then all the frequencies are summed together.

Since each lower frequency contributes to the frequencies above it, it may be necessary to make a second pass beginning again at the lowest desired frequency. Two consecutive passes should produce the desired spectrum within ± 10 percent. If a third pass is necessary this error may be reduced. After the desired spectrum has been completely synthesized, the data storage system 24 is calibrated and connected. Then a single shock is applied to the specimen being tested and a tape loop is prepared and a completed shock spectrum plot is made. Once the data is taken from the shake table 16 at full level, then shock spectrum analysis may be performed at any time since the synthesizer 12 and shake table 16 are no longer required for the shock analysis. The analyzer simultaneously computes the entire shock response to the single shock applied to the specimen at each frequency.

The particular shock spectrum analysis and synthesis method and apparatus described above is exemplary but is no means confined to the spectra patterns that have been described. Also, it should be noted that although the oscillators shown in FIG. 2 generate sinusoidal waveforms, other waveforms may be utilized so that higher-order harmonics may be used. For example, instead of steady-state sinusoids, a plurality of square waves may be used to synthesize a shock spectrum. It should also be understood that the synthesizer of the present invention is equally well suited to the simulation of the absolute Fourier spectra as well as a specific shock spectra.

The novel and improved shock spectrum analysis and synthesis method and apparatus of the present invention is very practical and completely compatible with commercially available shake table equipment. Obviously many modifications and variations of the present invention are possible in the light of the above teachings. It is therefore to be understood, that within the scope of the appended claims, the invention may be practiced otherwise than as specifically described.

What is claimed is:

1. A method of producing an electrical transient having a response spectrum corresponding to a desired pattern over a given frequency range, for use in a shock spectrum synthesis system comprising the steps of:

simultaneously generating a plurality of steady state electrical oscillating waves each having a different frequency;

summing a predetermined number of the lowest frequency waves for a predetermined time;

sequentially gating each of the remaining oscillating waves in an order corresponding to the higher frequencies first for a predetermined time; and summing all of the waves thereby producing the desired electrical transient.

2. A method in accordance with claim 1 further including the step of:

adjusting the gain of each of said waves so that the amplitude of the frequency components of said waves correspond to the frequency components of said given spectrum envelope.

3. Apparatus for producing an electrical transient waveform having a given response spectrum comprising:

means for simultaneously generating a plurality of steady state electrical oscillating waves, each of said waves having a different frequency;

means for summing a predetermined number of the lowest frequency waves for a predetermined time;

means for sequentially gating each of the remaining oscillating waves in an order corresponding to the higher frequencies first for a predetermined time, and means for summing all of the waves thereby producing the desired electrical transient.

* * * * *

UNITED STATES PATENT OFFICE
CERTIFICATE OF CORRECTION

Patent No. 3,733,555　　　　　　Dated May 15, 1973

Inventor(s) Philip Marshall & Randall L. Kroken

It is certified that error appears in the above-identified patent and that said Letters Patent are hereby corrected as shown below:

Column 2, Line 19, delete "2" and insert -- machine --.

Column 3, Line 50, in the equation delete "$\omega^{n2}$" and insert -- $\omega_n^2$ --.

Column 10, Line 28, delete the equation and substitute the following:

$$-- \ddot{x} + 2\xi\omega_n (\dot{x}-\dot{y}) + \omega_n^2 (x-y) = 0 \quad (1) --$$

Column 12, Line 41, delete " $\ddot{z}$ " and insert -- $\dot{z}$ --

Column 12, Lines 42 and 43, delete " ( $\ddot{x} - \ddot{y}$ )" and insert -- $(\dot{x} - \dot{y})$ --.

Column 12, Line 49, after the word "Since" and before the letter "n", insert --$\omega$-- so that it reads as follows:

--Since $\omega_n$ is a ...--.

Signed and sealed this 9th day of April 1974.

(SEAL)
Attest:

EDWARD M. FLETCHER, JR.　　　　　C. MARSHALL DANN
Attesting Officer　　　　　　　　Commissioner of Patents